(12) United States Patent
Dreps et al.

(10) Patent No.: US 6,542,999 B1
(45) Date of Patent: *Apr. 1, 2003

(54) SYSTEM FOR LATCHING FIRST AND SECOND DATA ON OPPOSITE EDGES OF A FIRST CLOCK AND OUTPUTTING BOTH DATA IN RESPONSE TO A SECOND CLOCK

(75) Inventors: Daniel Mark Dreps, Georgetown, TX (US); Kevin Charles Gower, LaGrangeville, NY (US); Frank David Ferraiolo, Essex, VT (US)

(73) Assignee: International Business Machines Corp., Armonk NY ( * ) Notice: Subject to any disclaimer, the term of this patent is extended or adjusted under 35 U.S.C. 154(b) by 0 days.

This patent is subject to a terminal disclaimer.

(21) Appl. No.: 09/434,801

(22) Filed: Nov. 5, 1999

(51) Int. Cl.[7] ............................. G06F 1/12; G06F 3/00

(52) U.S. Cl. ..................................... 713/400; 710/20

(58) Field of Search ............................. 713/400, 600; 710/20, 61

(56) References Cited

U.S. PATENT DOCUMENTS

| | | | | |
|---|---|---|---|---|
| 4,056,851 A | * | 11/1977 | Hovagimyan et al. | 710/61 |
| 5,471,581 A | * | 11/1995 | Munier et al. | 711/147 |
| 5,532,716 A | * | 7/1996 | Sano | 345/698 |
| 5,838,936 A | * | 11/1998 | Chau et al. | 710/20 |
| 6,334,163 B1 | * | 12/2001 | Dreps et al. | 710/60 |

* cited by examiner

*Primary Examiner*—Thomas Lee
*Assistant Examiner*—Suresh K Suryawanshi
(74) *Attorney, Agent, or Firm*—Barry S. Newberger; Winstead Sechrest & Minick P.C.; Mark E. McBurney

(57) ABSTRACT

An elastic interface apparatus and method are implemented. The elastic interface includes a plurality of storage units for storing for storing a stream of data values, wherein each storage unit sequentially stores members of respective sets of data values. Each data value is stored for a predetermined number of periods of a local clock. Selection circuitry may be coupled to the storage units to select the respective data value from the data stream for storage in the corresponding storage unit. Data is sequentially output from each storage unit in synchrony with the local clock on a target cycle of the local clock.

45 Claims, 13 Drawing Sheets

SYSTEM FOR LATCHING FIRST AND SECOND DATA ON OPPOSITE EDGES OF A FIRST CLOCK AND OUTPUTTING BOTH DATA IN RESPONSE TO A SECOND CLOCK

CROSS REFERENCE TO RELATED APPLICATIONS

The present invention is related to the following U.S. patent applications which are hereby incorporated herein by reference:

Ser. No. 09/263,671, now U.S. Pat. No. 6,421,784 entitled "Programmable Delay Element";

Ser. No. 09/263,662, still pending, entitled "Dynamic Wave Pipelined Interface Apparatus and Method Therefor";

Ser. No. 09/263,661, now U.S. Pat. No. 6,334,163 entitled "An Elastic Interface Apparatus and Method Therefor"; and Ser. No. 09/434,800, still pending, entitled "Elastic Interface For Communication With A Master.

TECHNICAL FIELD

The present invention relates in general to data processing systems, and in particular, to the interface between dynamic, or clocked, integrated circuit chips in a data processing system.

BACKGROUND INFORMATION

Modern data processing systems require the transfer of data between dynamic, or clocked, circuits embodied in multiple chips in the system. For example, data may need to be transferred between central processing units (CPUs) in a multi-CPU system, or between a CPU and the memory system which may include a memory controller and off-chip cache. Data transfers are synchronous, and data is expected to be delivered to the circuitry on the chip on a predetermined system cycle. As CPU speeds have increased, the speed of the interface between chips (bus cycle time) has become the limiting constraint as the latency across the interface exceeds the system clock period. In order to maintain system synchronization, the system designer must slow the speed of the bus in order that the cycle on which data arrives be unambiguous.

This may be further understood by referring to FIG. 1A, in which is depicted, in block diagram form a prior art interface between two integrated circuit chips, chip 102 and chip 104 in a data processing system. Each of chips 102 and 104 receive a reference clock 106 coupled to a phase lock loop, PLL 108. PLL 108 generates a local clock, clock 110 in chip 102 and clock 111 in chip 104, locked to reference clock 106. Reference clock 106 provides a "time zero" reference, and may be asserted for multiple periods of local clocks 110 and 111, depending on the multiplication of PLL 108. The bus clock 113 is derived from reference clock 106 by dividing local clock 110 by a predetermined integer, N, in divider 112. Data to be sent from chip 102 to chip 104 is latched on a predetermined edge of the divided local clock 110 and driven on to data line 116 via driver 118. Data is received at receiver (RX) 120 and captured into destination latch 122 on a predetermined edge of the divided local clock 111 in chip 104. Due to the physical separation of chip 102 and chip 104, the data appears at input 124 of destination latch 122 delayed in time. (The contribution of RX 120 to the latency is typically small relative to the delay due to the data transfer.) The Time delay is referred to as the latency, and will be discussed further in conjunction with FIG. 1B.

Similarly, chip 104 sends data to chip 102 via data line 126. Data to be sent from chip 104 is latched in latch 128 on a predetermined edge of the output signal from divider 130 which divides local clock 111 by N. The data is driven onto data line 126 via driver 132 and captured on destination latch 134 via receiver 136. The data input to chip 102 is captured into data latch 134 on a predetermined edge of an output of divider 130 which also divides local clock 110 by N.

In FIG. 1B, there is illustrated an exemplary timing diagram for interface 100 of FIG. 1A, in accordance with the prior art. Data 115 sent from chip 102 to chip 104 is latched, in latch 114, on a rising edge, $t_1$, of bus clock 113. Bus clock 113 is generated by dividing local clock 110 by N in dividers 112 and 130 in chip 102. Following a delay by the latency, $T_1$, data 117 appears at an input to destination latch 122, and is latched on rising edge $t_2$ of bus clock 123. Bus clock 123 is generated by dividing local clock 111 by N in dividers 112 and 130 in chip 104. Thus, in the prior art in accordance with FIG. 1B, data 125 appears in chip 104 one bus cycle following its launch from chip 102. In FIG. 1B, there is zero skew between bus clock 113 and bus clock 123.

If, in interface 100 in FIG. 1A, the bus clock speed is increased, the latency may exceed one bus clock cycle. Then the exemplary timing diagram illustrated in FIG. 1C may result. As before, data 115 has been latched on edge $t_1$ of bus clock 113. Data 117 appears at input 124 of destination latch 122 after latency time, $T_1$ which is longer than the period of bus clock 113 and bus clock 123. Data 117 is latched on edge $t_3$ of bus clock 123 in chip 104 to provide data 125 on chip 104. If interface 100 between chips 102 and 104 represents the interface having the longest latency from among a plurality of interfaces between chip 102 and the plurality of other chips within a data processing system, then the two cycle latency illustrated in FIG. 1C represents the "target" cycle for the transmission and capture of data between chips, such as chip 102 and chip 104. The target cycle is the predetermined cycle at which data is expected by the chip. Interfaces having a shorter latency may need to be padded, in accordance with the prior art, in order to ensure synchronous operation. The padding ensures that faster paths in interface 100 have latencies greater than one bus clock cycle and less than two bus clock cycles, whereby data synchronization may be maintained.

This may be further understood by referring now to FIG. 1D, illustrating a plurality 101 of chips, chips 102, 103 and 104. Chip 102 and chip 104 are coupled on "slow" path 152 having a long latency, $T_S$. Chip 103 is coupled to chip 102 via "fast" path 154 having a short latency period, $T_F$. A "nominal" path coupling plurality 101 of chips 102–105 has latency $T_M$, such as the latency on path 156 between chip 102 and chip 105.

The timing diagram in FIG. 1E provides further detail. FIG. 1E illustrates a timing diagram similar to that in FIG. 1C in which the target cycle for the capture of data into a receiving chip is two bus cycles. In FIG. 1E, the nominal latency, $T_M$, is shown to be 1.5 bus cycles, the fast path latency, $T'_F$, is illustrated to be just greater than one bus cycle, and the slow path latency, $T_S$, is shown to be slightly less than two bus cycles. In this case, each of the plurality of chips 101 in FIG. 1D capture data on the target cycle, two bus cycles after data launch.

If, however, the fast path is shorter, illustrated by fast path latency $T_F$ data synchronization is lost. In this case, data arrives at chip 103 prior to transition $t_2$ of the chip 103 bus clock as illustrated by the dotted portion of data 117 at chip 103, and is latched into chip 103 after one bus cycle. This is illustrated by the dotted portion of data 125 in chip 103. In order to restore synchronization, the fast path, path 154, between chips 102 and 103 would require padding to increase the fast path latency, from $T'_F$ to $T_F$. Consequently, the timing of such a prior art interface is tuned to a specific operating range, a particular interface length, and is valid only for the technology for which the design was timed and analyzed.

Likewise, increasing the clock speed of the chips in FIG. 1D will result in a loss of synchronization. This may be understood by considering an explicit example. The local clock cycle time is first taken have a 1 nanosecond (ns) period. The bus clock will have a period that is a fixed multiple, which will be taken to be two, of the local clock. Let the nominal latency of the interface, $T_M$, be 3 ns with +/−0.99 ns of timing variation, i.e. the best case or fast path, $T_F$, is 2 ns and the worse case, or slow path, $T_S$, is 4 ns. The data will arrive after two ns and before four ns. Hence the interface will operate under all conditions i.e. data is guaranteed to arrive after the first bus cycle and before the second bus cycle. However if the speed of the chips is increased to a 0.9 ns cycle time, the bus cycle time is changed to 1.8 ns. In order to ensure enough time for the data to propagate across the interface under worse case conditions the data must not be captured before 2.5 bus cycles, or 4.5 ns, because two bus cycles is less than the slow path time, $T_S$, or 4 ns. Then, in order to operate a 1.8 ns bus cycle, the fastest data can arrive is 1.5*1.8=2.7 ns (one bus cycle earlier), to ensure data arrives on the same cycle for all conditions. However, the earliest data can arrive from the above latency numbers is via the fast path with a $T_F$ of 3 ns−0.99 ns=2.01 ns. Thus, operating at a bus cycle time of 1.8 ns cannot be supported in a conventional synchronous design. In order to operate synchronously, the bus to processor ratio must be slowed to at least 3:1 and operate at a 2.7 ns cycle time 2.7 ns*1.5 cycles=4.05 ns and 2.7 ns*0.5 cycles=1.35 ns) which militates against the increase in local clock speed.

Thus, there is a need in the art for apparatus and methods to accommodate data transfers between chips in a data processing system having increasing clock speeds. In particular, there is a need for methods and apparatus to ensure data synchronization between chips in data processing systems in which path latencies vary over more than one bus cycle, and in which the need for design specific hardware padding is eliminated.

SUMMARY OF THE INVENTION

The aforementioned needs are addressed by the present invention. Accordingly, there is provided, in a first form, an interface apparatus. The apparatus includes a first storage device operable for storing a first set of data values, and a second storage device operable for storing a second set of data values. Member data values of the first and second sets of data values may have a first predetermined width, n. The first and second storage devices are operable for latching data on opposite edges of a first clock signal. Circuitry, coupled to the first and second storage devices, is operable for outputting a first data value from the first storage device and a second data value from the second storage device in response to a second clock signal, the first and second data values constituting an output value having a second width, 2n.

There is also provided, an interface apparatus in an alternative embodiment. The apparatus includes a first plurality of storage devices, each storage device of the plurality is operable for storing a corresponding one of plurality of sets of data values. Each member data value of the plurality of sets has a first predetermined first bit width, n. The first plurality of storage devices stores data values in response to a first clock signal. Selection circuitry, coupled to the plurality of storage devices, is operable for sequentially outputting each corresponding set of data values, in which the data values are received in an input data stream. The circuitry sequentially outputs each corresponding set of data values in response to at least one first control signal. Circuitry, coupled to the plurality of storage devices, is operable for receiving the plurality of sets of data values and sequentially outputting, in response thereto, a set of output data values, each output data value having a predetermined second bit width, m·n. The output data values are output in response to a second clock.

Additionally, there is provided, in a second form a data processing system. The system includes a first data processing device a second data processing device coupled to the first data processing device via an elastic interface. The elastic interface contains a first storage device operable for storing a first set of data values, and a second storage device operable for storing a second set of data values. The first and second storage devices are operable for latching data on opposite edges of a first clock signal. Member data values of the first and second sets of data values have a first predetermined width, n Circuitry, coupled to the first and second storage devices, is operable for outputting a first data value from the first storage device and a second data value from the second storage device in response to a second clock signal, the first and second data values constituting an output value having a second width, 2n.

There is further provided a data processing system in an alternative embodiment. The system includes a first data processing device, and a second data processing device. The first and second devices are coupled via an elastic interface. The interface has a first plurality of storage devices, each storage device of the plurality is operable for storing a corresponding one of plurality of sets of data values. Each member data value of the plurality of sets has a first predetermined first bit width, n The first plurality of storage devices store data values in response to a first clock signal. Selection circuitry, coupled to the plurality of storage devices, is operable for sequentially outputting each corresponding set of data values. The data values are received in an input data stream, and the selection circuitry sequentially outputs each corresponding set of data values in response to at least one first control signal. Circuitry, coupled to the plurality of storage devices, is operable for receiving the plurality of sets of data values and sequentially outputting, in response thereto, a set of output data values, each output data value having a predetermined second bit width, m·n, wherein the output data values are output in response to a second clock.

There is also provided, in a third form, a method of interfacing data processing devices. The method includes storing a first plurality of sets of data values in a first plurality of storage elements. Each data value of each of the first plurality of sets is stored for a predetermined time interval relative to a first clock. Each data value is communicated in a data stream between the data processing devices. Also included is selectively sequentially receiving members of the first plurality of data values at a second plurality of storage elements having m storage elements. The members received in the receiving step are stored in corresponding elements of the second plurality of storage elements in response to a second clock. An output of each storage element of the second plurality of storage elements providing an n-bit wide portion of an (m·n)-bit wide output data value.

BRIEF DESCRIPTION OF THE DRAWINGS

For a more complete understanding of the present invention, and the advantages thereof, reference is now made to the following descriptions taken in conjunction with the a accompanying drawings, in which.

DETAILED DESCRIPTION

Figure 1A:
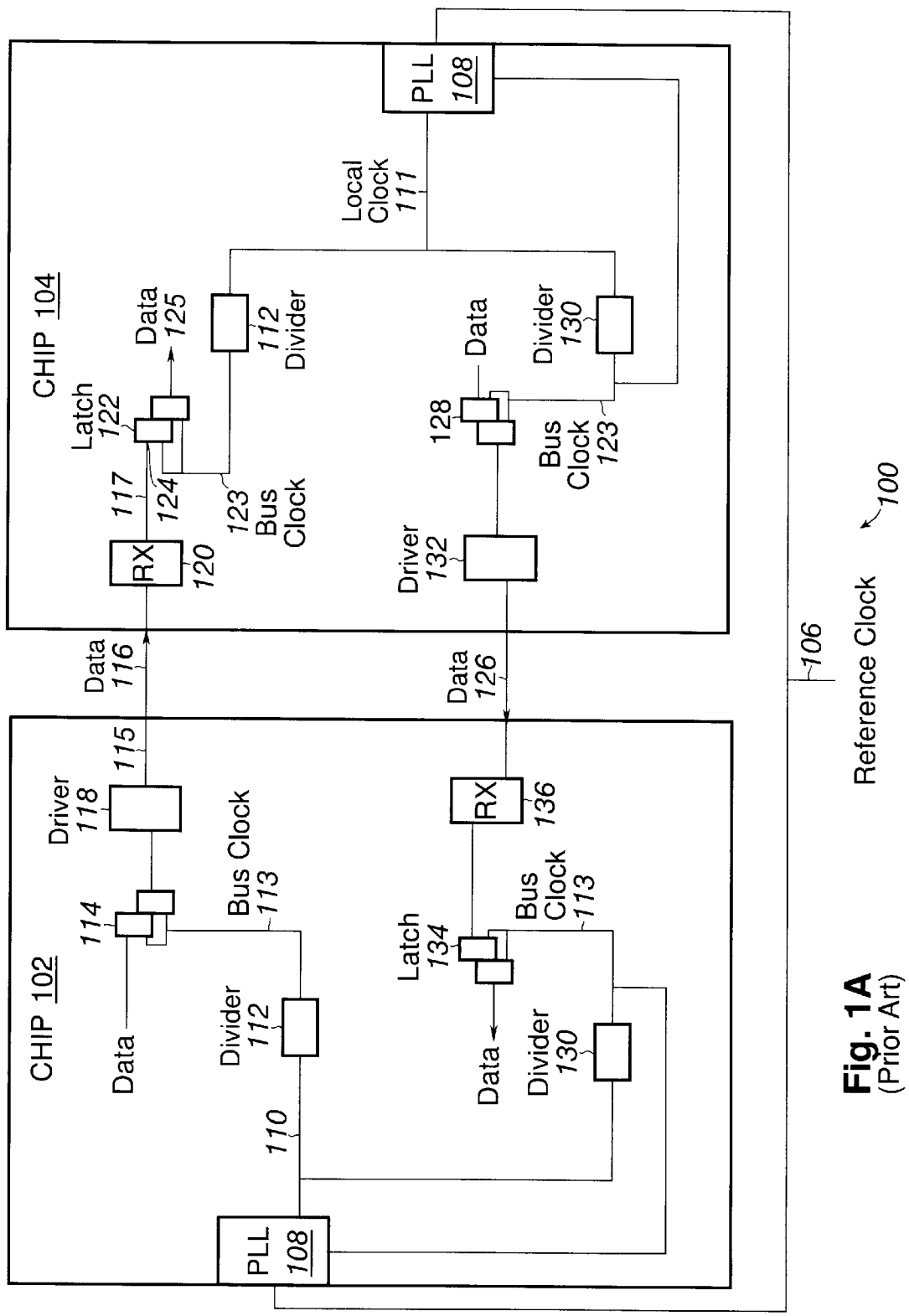
FIG. 1A illustrates a chip interface in accordance with the prior art.
Figure 1B:
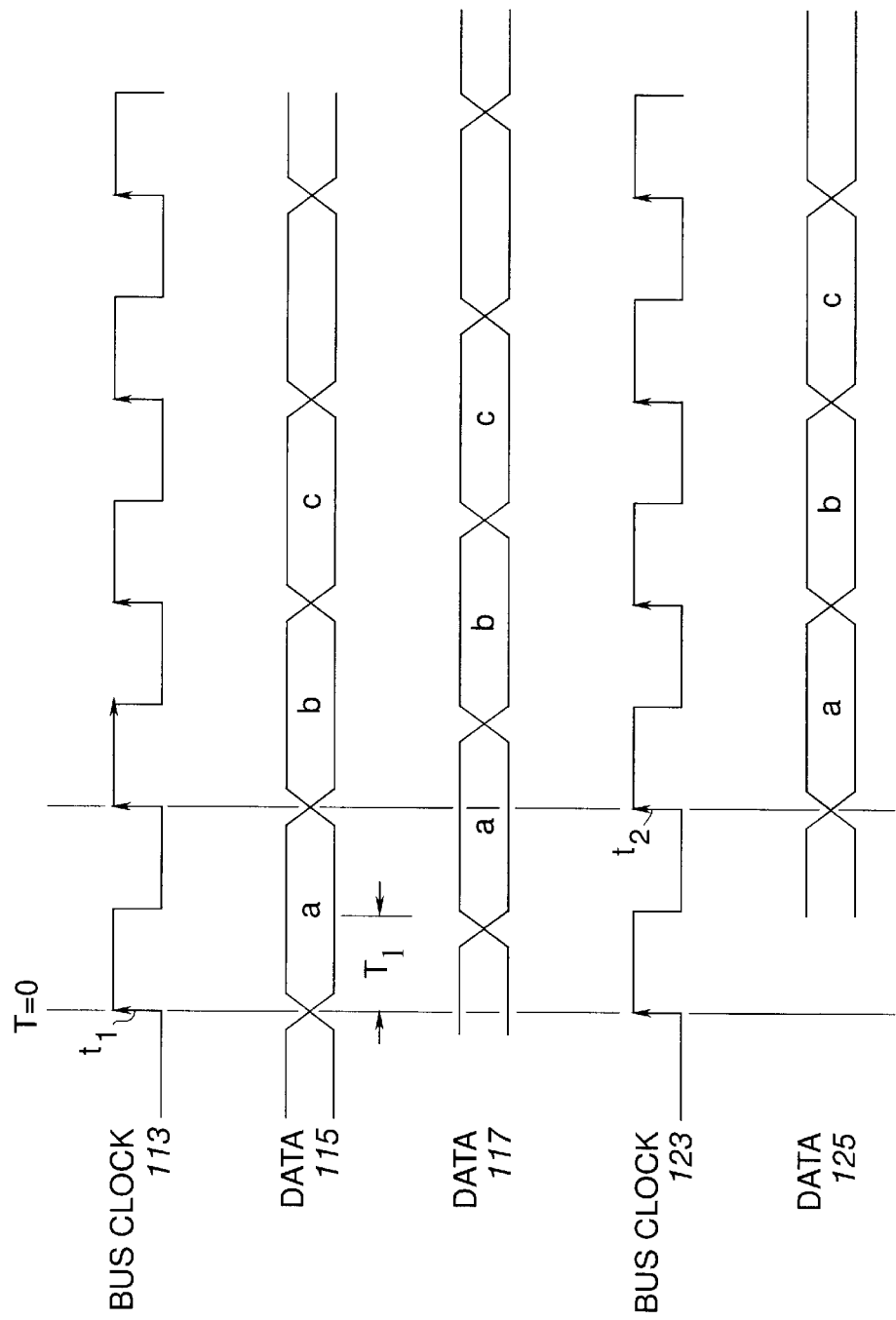
FIG. 1B schematically illustrates a timing diagram for an embodiment of the chip interface of FIG. 1A, in accordance with the prior art.
Figure 1C:
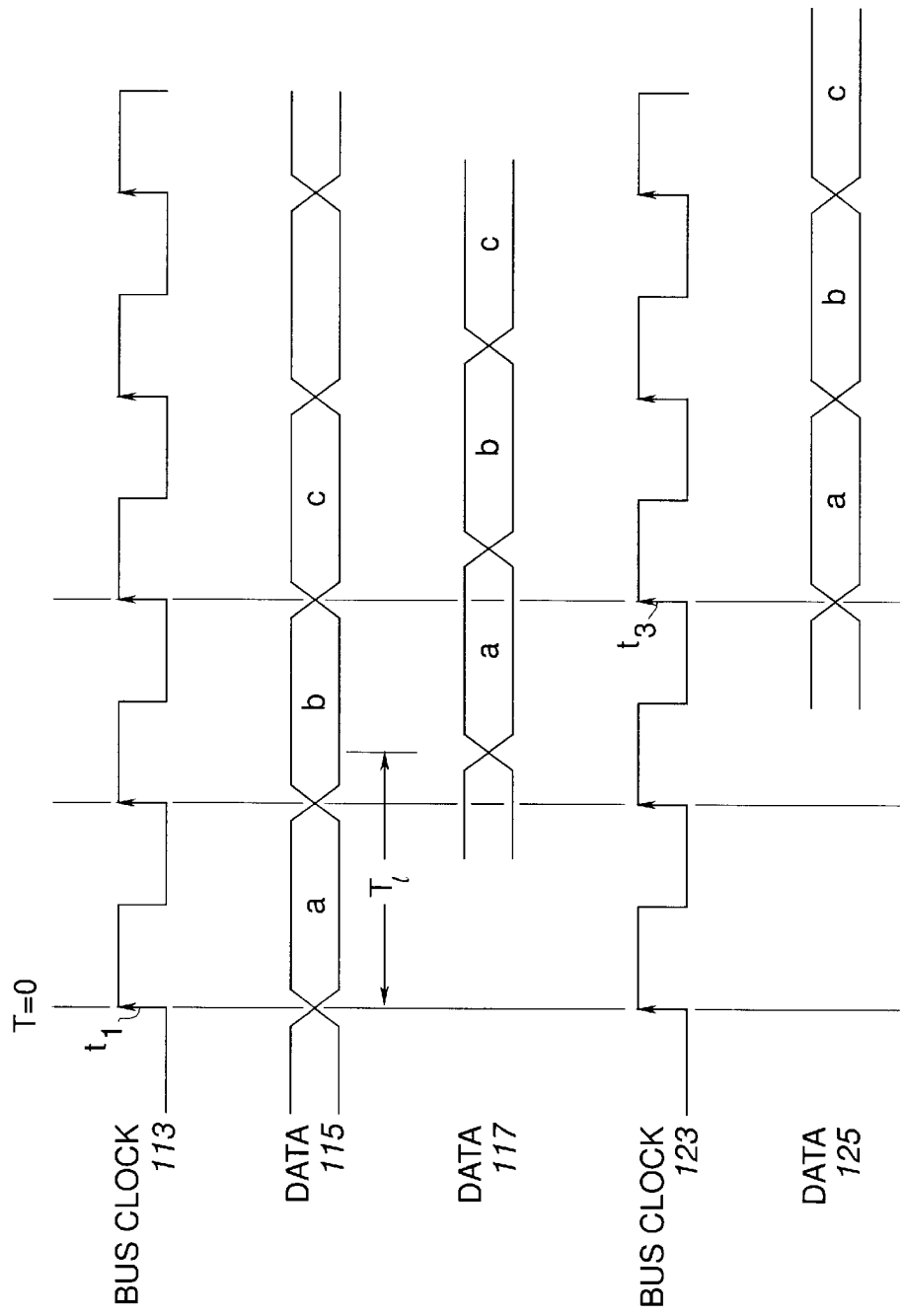
FIG. 1C illustrates a timing diagram for another embodiment of the chip interface of FIG. 1A according to the prior art.

The present invention provides an elastic interface mechanism that implements data synchronization among a plurality of data processing chips in a data processing system. Data synchronization is accomplished without the need for padding which otherwise complicates the physical wiring, and adds complexity to the hardware design. The "elasticity" of the interface accounts for the physical difference between paths coupling the data processing chips in the system. By capturing the received data into a plurality of storage elements, and selectively steering the latched data, data synchronization is provided in a data processing system having latencies that vary by more than one bus clock cycle. Synchronization may be established dynamically by performing an initialization alignment procedure, on power-up or following a reset. In this way, synchronization of data may be accomplished in accordance with the principles of the present invention without the need for a timing analysis of the board design and fast path padding.

In the following description, numerous specific details are set forth such as bus clock frequencies and synchronization cycles, clock edges, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail.

Refer now to FIGS. 2–9 wherein depicted elements are not necessarily shown to scale and wherein like or similar elements are designated by the same reference numeral through the several views.

Figure 2:
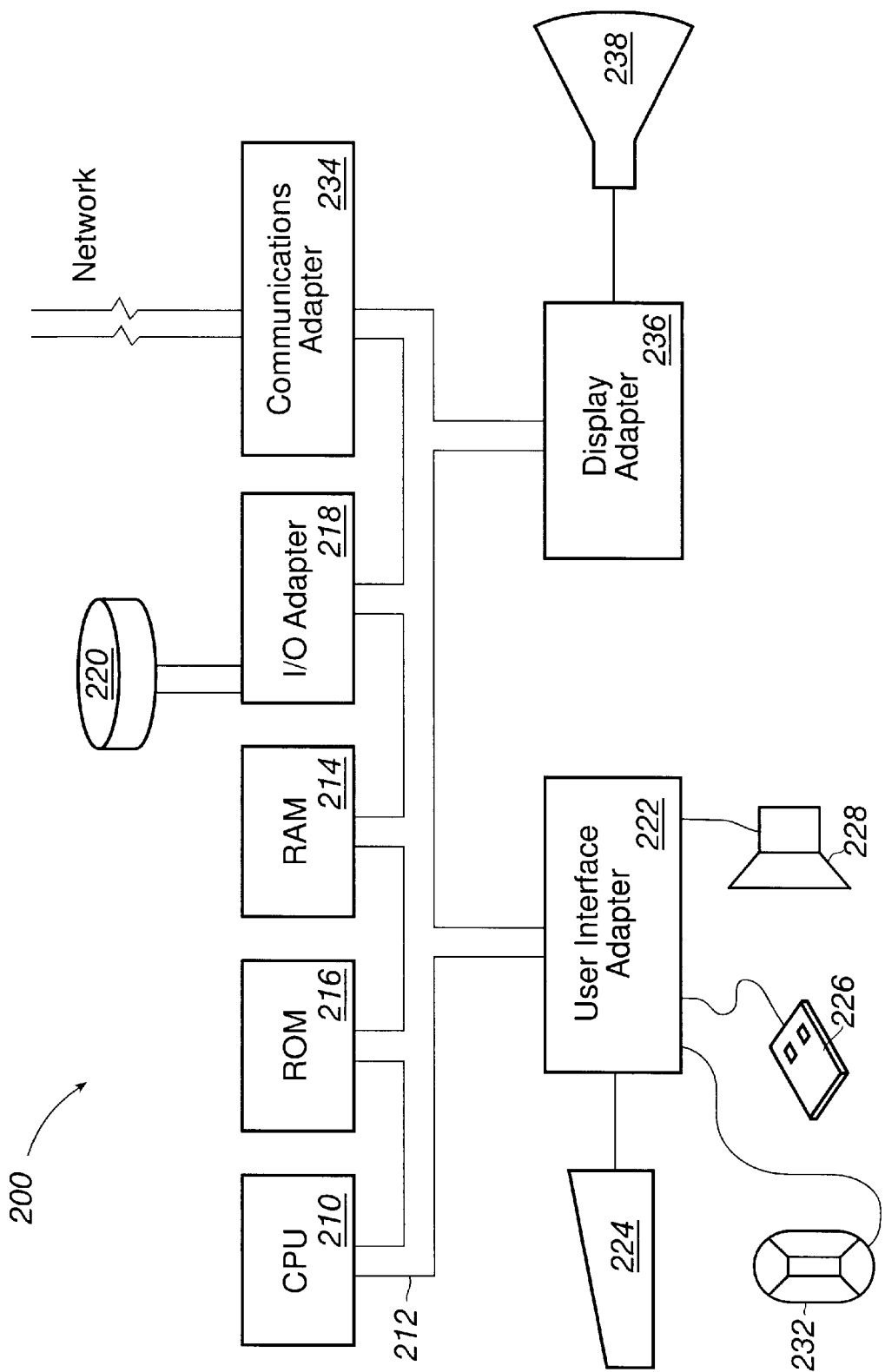
FIG. 2 illustrates in block diagram form, a representative hardware environment for practicing the invention.

A representative hardware environment for practicing the present invention is depicted in FIG. 2, which illustrates a typical hardware configuration of data processing system 213 in accordance with the subject invention having central processing unit (CPU) 210, such as a conventional microprocessor, and a number of other units interconnected via system bus 212. Data processing system 213 includes random access memory (RAM) 214, read only memory (ROM) 216, and input/output (I/O) adapter 218 for connecting peripheral devices such as disk units 220 to bus 212, user interface adapter 222 for connecting keyboard 224, mouse 226, and/or other user interface devices such as a touch screen device (not shown) to bus 212, communication adapter 234 for connecting workstation 213 to a data processing network, and display adapter 236 for connecting bus 212 to display device 238. CPU 210 may include other circuitry not shown herein which will include circuitry commonly found within a microprocessor, e.g., execution unit, bus interface unit, arithmetic logic unit, etc. The interface of the present invention may be included in CPU 210. Additionally, the present invention may be incorporated into storage devices, such as RAM 214 (which may include memory control circuitry, not shown herein). CPU 210 may also reside on a single integrated circuit.

Figure 3:
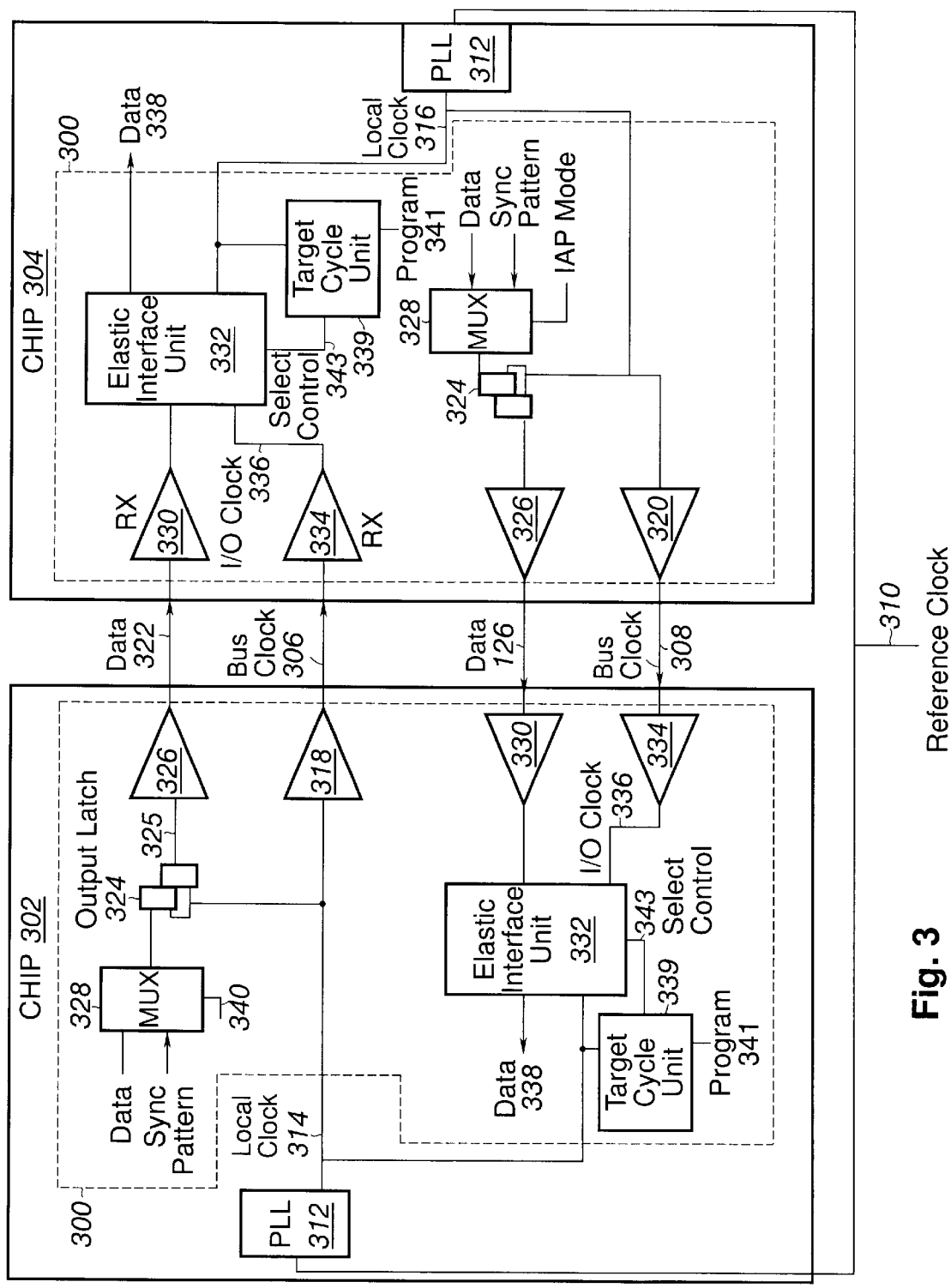
FIG. 3 illustrates in block diagram form, a chip interface in accordance with an embodiment of the present invention.

Refer now to FIG. 3 in which is illustrated an interface 300 in accordance with the present invention. Interface 300 is incorporated in each of chip 302 and chip 304 which communicate data with each other via a respective interface 300. (Although the embodiment of the present invention is described in the context of a chip to chip interface, the principals of the present invention may be embodied in an interface between any pair of clocked latches.) Data is transferred between chips 302 and 304 at a rate determined by a bus clock, bus clocks 306 and 308. Bus clocks 306 and 308 are nominally the same frequency, and are derived from reference clock 310 provided to a PLL, PLL 312 in each of chips 302 and 304. In an embodiment of the present invention, reference clock 310 may be a system clock. Each of PLL 312 outputs a local clock, local clock 314 in chip 302 and local clock 316 in chip 304 which is locked in phase to reference clock 310, and may be a preselected integer, M, multiple of the period of reference clock 310. Local clock 314 is buffered by driver 318 to provide bus clock 306 from chip 302. Similarly, local clock 316 is buffered by driver 320 to provide bus clock 308 from chip 304.

The bus clock is provided along with the data communicated from the chip. Data 322 from chip 302 is latched into output latch 324 and driven and buffered by driver 326. The data is latched on a preselected edge of local clock 314. The data is received via multiplexer (MUX) 328. MUX 328 also receives a predetermined synchronization pattern in conjunction with the initialization alignment procedure. These will be further described below.

Data 322 is buffered by receiver (RX) 330 and provided to an elastic interface unit 332. Bus clock 306 sent along with data 322 is buffered by RX 334, the output of which forms I/O clock 336, also provided to elastic interface 332. Data from chip 304 being sent to chip 302, along with bus clock 308, is similarly received by interface 300 in chip 302, and it would be understood that the description of elastic device 332 to follow applies equally well in the receipt of data by chip 302 from chip 304.

Figure 1D:
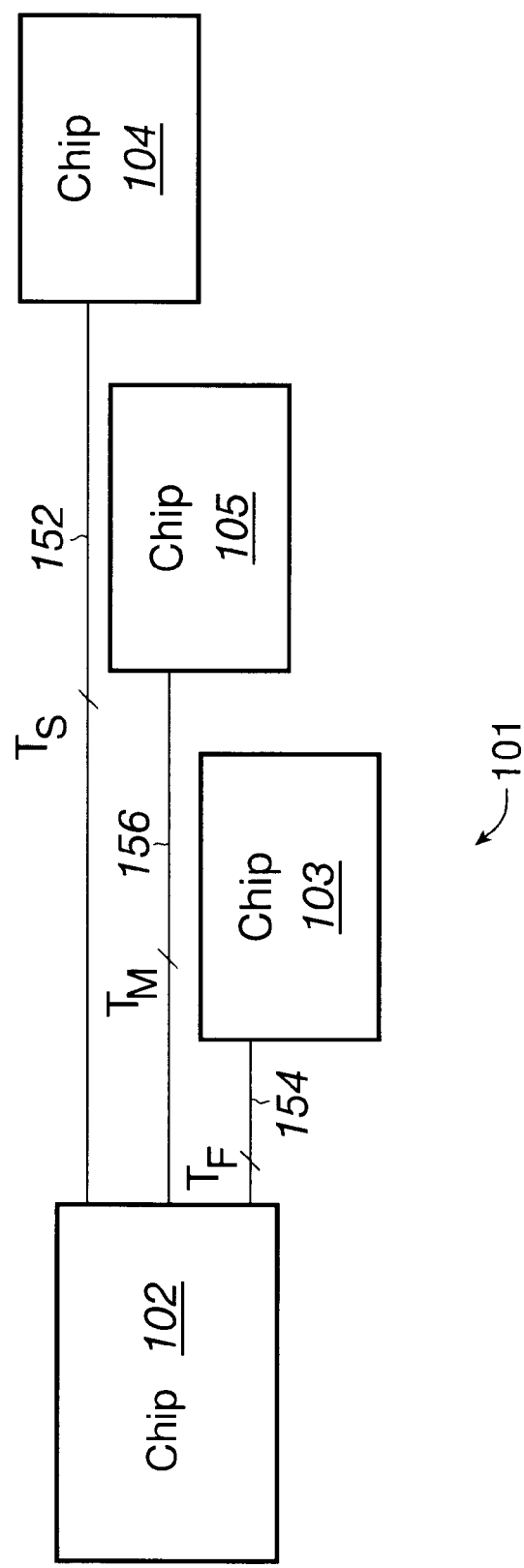
FIG. 1D illustrates a plurality of interconnected chips in a data processing system.
Figure 1E:
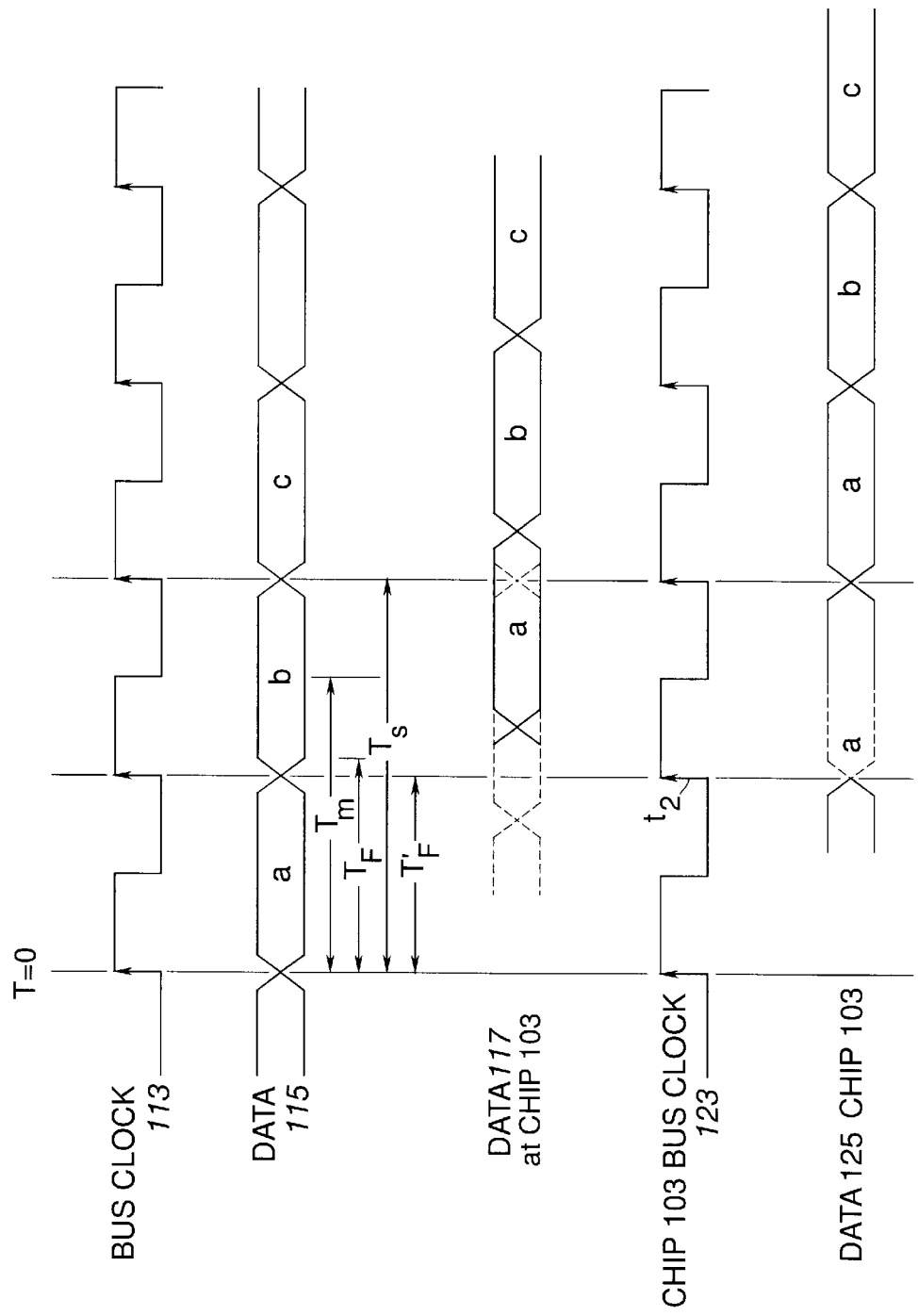
FIG. 1E schematically illustrates a timing diagram for an embodiment of the plurality of interconnected chips of FIG. 1D.
Figure 4A:
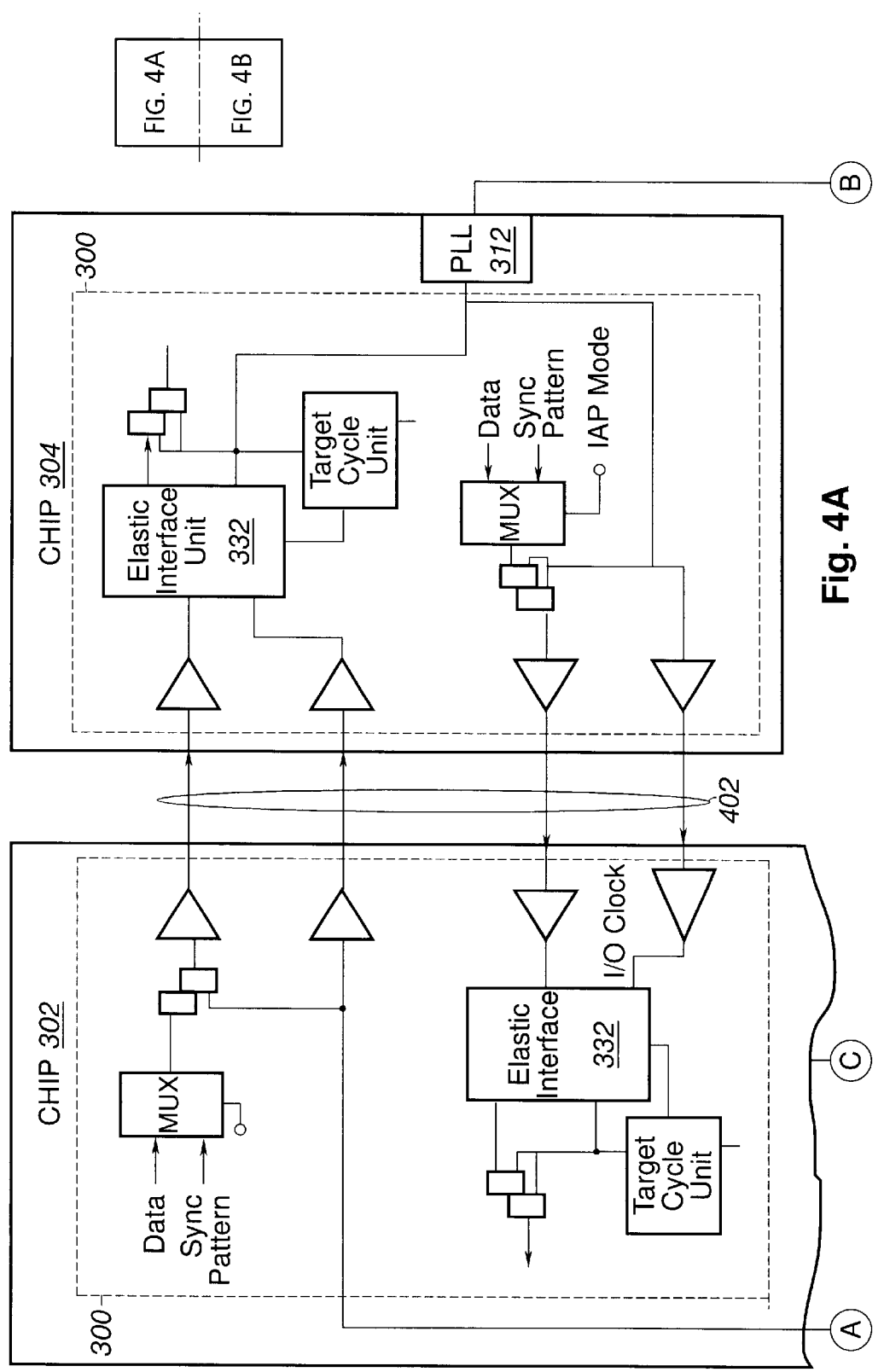
FIG. 4 illustrates an alternative embodiment of a chip interface in accordance with the present invention.
Figure 4B:
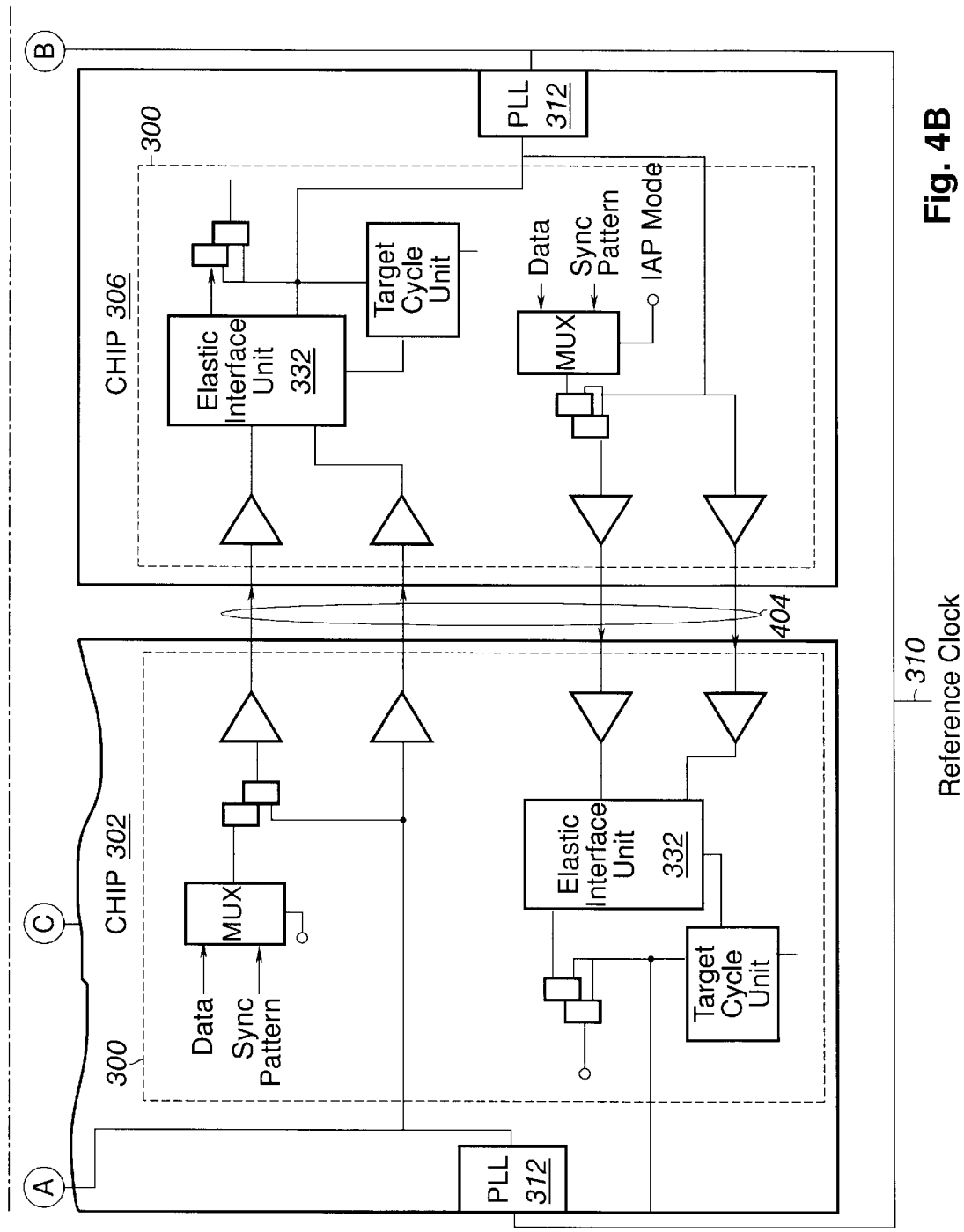

The operation of an elastic interface in accordance with the principles of the present invention, such as elastic interface 300, may be further understood by referring now to FIG. 4. In FIG. 4, chip 302 exchanges data with chip 304, as in FIG. 3, and additionally with chip 306. Chip 302 includes two of interfaces 300, one of which couples chip 302 to chip 304 via an interface 300 included in chip 304, and the second of which couples chip 302 to chip 306 which also includes an interface 300 in accordance with an embodiment of the present invention. Path 402, coupling chips 302 and 304 may be a fast path, similar to path 154 in FIG. 1D having a latency $T_F$, and path 404 coupling chip 302 to chip 306 may be a slow path, such as path 152 in FIG. 1D with a latency $T_S$. In an interface in accordance with the prior art, if the latency difference between paths 402 and 404 exceeds a period of the bus clock, path 402 would require padding in order to maintain synchronization of the data, as previously described. However, interfaces 300 incorporating elastic interface unit 332 accommodates the difference in the latencies between path 402 and 404. By setting the target cycle in each of elastic interfaces 332 in chips 304 and 306 to be the same cycle, as described hereinabove, data synchrony among chips 302, 304, and 306 is maintained.

Returning to FIG. 3, target cycle unit 339 sets the target cycle on which data is latched by the local clock in the receiving chip, such as local clock 316 in chip 304. The target cycle discussed in detail in conjunction with FIGS. 6A/B, illustrating an interface 322 having an elasticity of two. For an interface having an elasticity, E, target cycle unit may include a divide-by-E circuit. Additionally, target cycle unit 339 may include a programming register for holding the predetermined target cycle value, which may be loaded via target program 341. The target cycle programmed in target cycle unit 339 in chip 302 may be different than the target cycle programmed in target cycle unit 339 in chip 304. Target cycle unit 339 outputs select control 343, which may include a plurality of signals, depending on the embodiment of interface unit 332 and the corresponding elasticity, E. Select control 343 will be further described in conjunction with FIGS. 6A–6B in which an embodiment of interface unit 332 is illustrated.

Figure 5A:
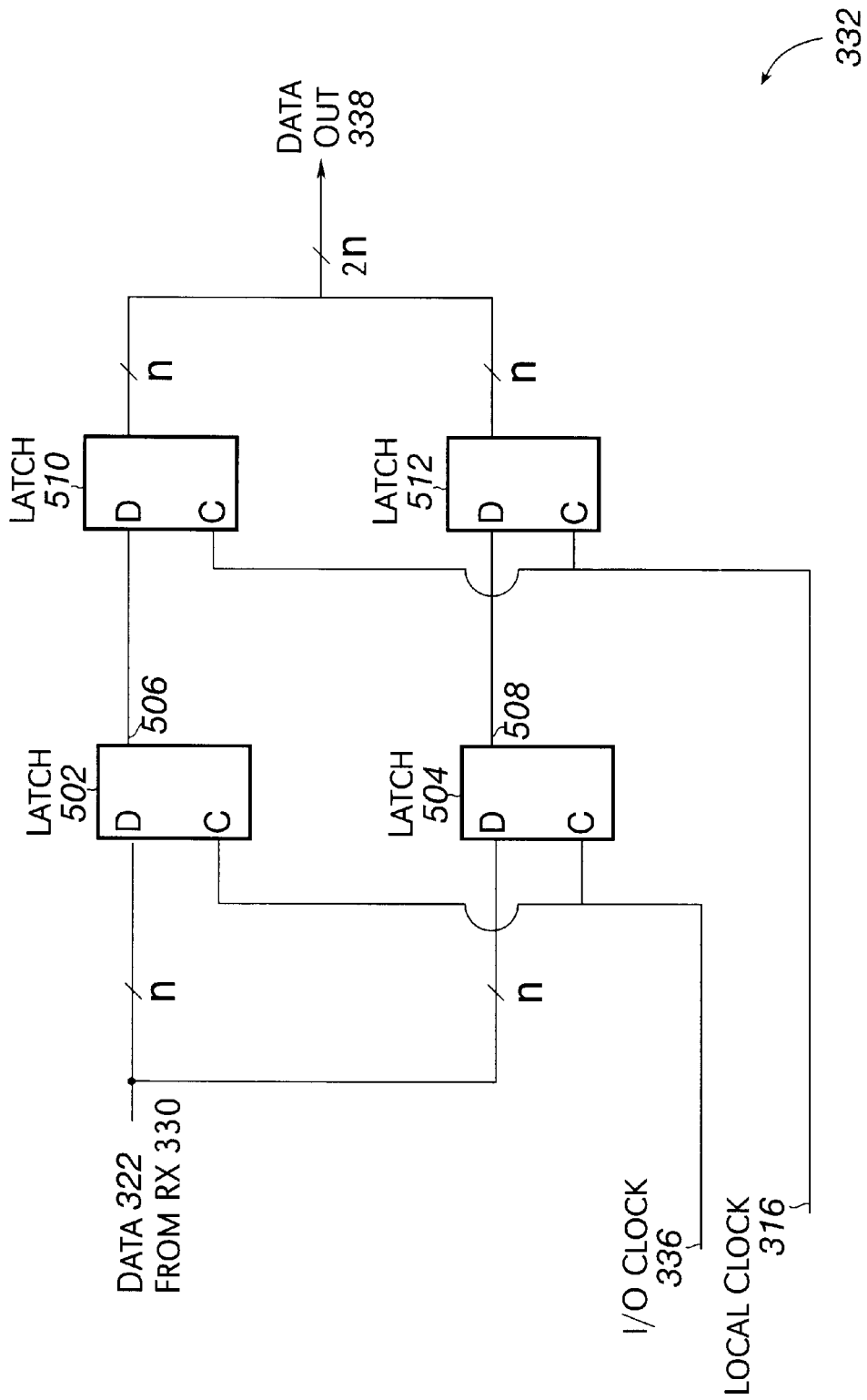
FIG. 5A illustrates, in block diagram form, an elastic interface in accordance with an embodiment of the present invention.

An embodiment of an elastic interface 332 in accordance with the principles of the present invention having an elasticity of two periods is illustrated in FIG. 5A. The interface 332 depicted in FIG. 5A, referred to as a "full speed" embodiment, allows the receive chip to opera with a local clock that is one-half the speed of the local clock of the sending chip.

Data 322 is coupled to the D inputs of latches 502 and 504. Latch 502 is an edge-triggered flip flop (FF). When the clock (C) in latch 502 transitions from a first predetermined logic state, or level, to a second logic state, data on the D input flushes is held on output 506. (in the embodiment of FIG. 5A, the first state corresponds to a "low" logic level and the second state corresponds to a "high" logic level, whereby the transition constitutes a rising, or positive, edge. However, an alternative embodiment having the complementary logic states would be within the spirit and scope of the present invention.) Latch 504 is a "polarity hold", or "flush" latch. Such a latch may also be referred to as a "transparent" latch. Latch 504 flushes data on its D input through to output 508 when its clock, C, has the second logic level. The data is latched on the transition from the second logic level to the first logic level of the clock and held until the clock transitions from The first logic level to the second logic level, which in the embodiment of FIG. 5A, is "high". (Again, an alternative embodiment having complementary logic states would be within the spirit and scope of the present invention.) The flush-through property allows data to become available without having to wait until a latch is clocked, thereby implementing a "low-latency-low-elasticity" embodiment of interface unit 332.

In the embodiment of elastic interface 332 illustrated in FIG. 5A, latches 502 and 504 are clocked by I/O clock 336. Elastic interface 332 of FIG. 5A is a double data rate (DDR) device in that data is latched into one of latches 502 and 504 on each transition of I/O clock 336. As previously noted, the period of I/O clock 336 is twice that of local clock 314, corresponding to the sending chip local clock, and the same as that of local clock 316, corresponding to the receiving chip clock, and bus clock 306. Bus clock 306 is centered in a data window tat is two local clock periods of local clock 314 in width. The centering of the data and the launch bus clock is described in the co-pending, commonly-owned U.S. Patent Application entitled "Dynamic Wave-Pipelined Interface and Method Therefor," hereinabove incorporated herein by reference.

Figure 5B:
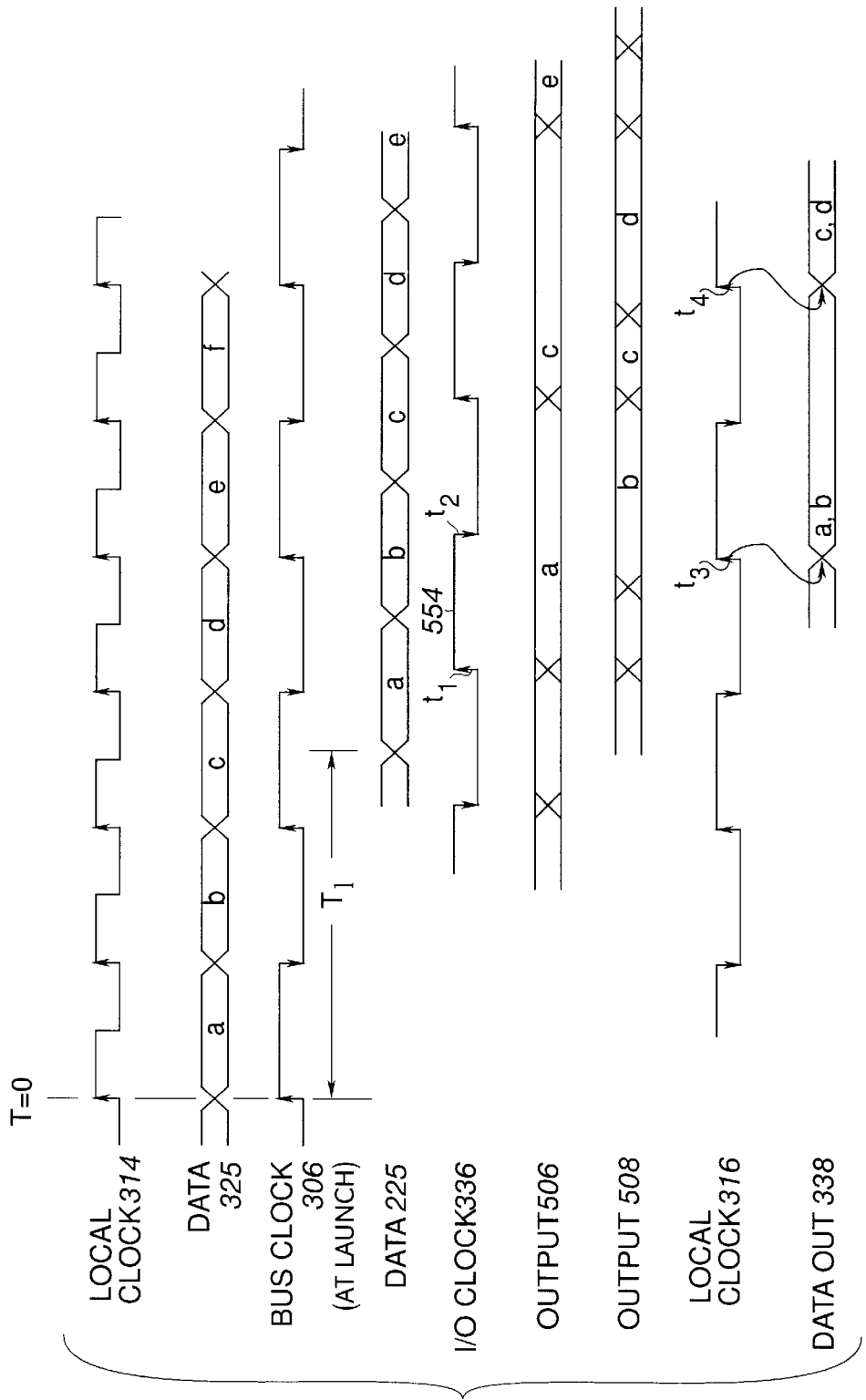
FIG. 5B schematically illustrates a timing diagram for the elastic interface embodiment of FIG. 5A.

The embodiment of elastic interface unit 332 is FIG. 5A may be further understood by referring to the corresponding timing diagram shown in FIG. 5B. When data value a arrives at elastic interface unit 332, data portion a is substantially centered on transition $t_1$ of I/O clock 336. I/O clock 336 is derived from the bus clock and both the data 225 and I/O clock 336 are shifted in phase relative to the bus clock at launch by the latency of the path between the chips, as previously described. At launch, as discussed above, the data and bus clock are substantially centered. At edge $t_1$, data value a is latched whereby it is held for one period of local clock 316.

On the other hand, data value b flushes through to output 508 of latch 504 when it arrives at elastic interface unit 332 from RX 230 because I/O clock 336 is high, at flattop 554. Data value b is then held on output 508 by negative edge $t_2$ of I/O clock 336. Data value b is held for one period of local clock 316.

Data stream 322 is captured into the local clock fame at output 338 by latches 510 and 512. The two data streams represented by outputs 506 and 508 are, respectively, latched into latches 510 and 512 by local clock 316. Latches 510 and 512 are edge-triggered flip-flops. Data is latched on a predetermined edge (positive in the embodiment of FIGS. 5A–5B) of local clock 316. Output 338 has a width twice that of the data values in data stream 322. (It would be understood by an artisan of ordinary skill that the present invention may be used in an interface that is a plurality, n, of bits wide. For example, alternative embodiments may be one bit in width, a byte in width a word in width, etc. Thus, data values a and b, in accordance with the timing diagram in FIG. 5B, are latched into latches 510 and 512, respectively, on edge $t_3$ of local clock 316. Subsequently, at edge $t_4$, data values c and d are latched into latches 510 and 512, respectively, and appear on data out 338. Each of the data values is valid for one period of local clock 316, or, equivalently, two periods of bus clock 306.

Figure 6A:
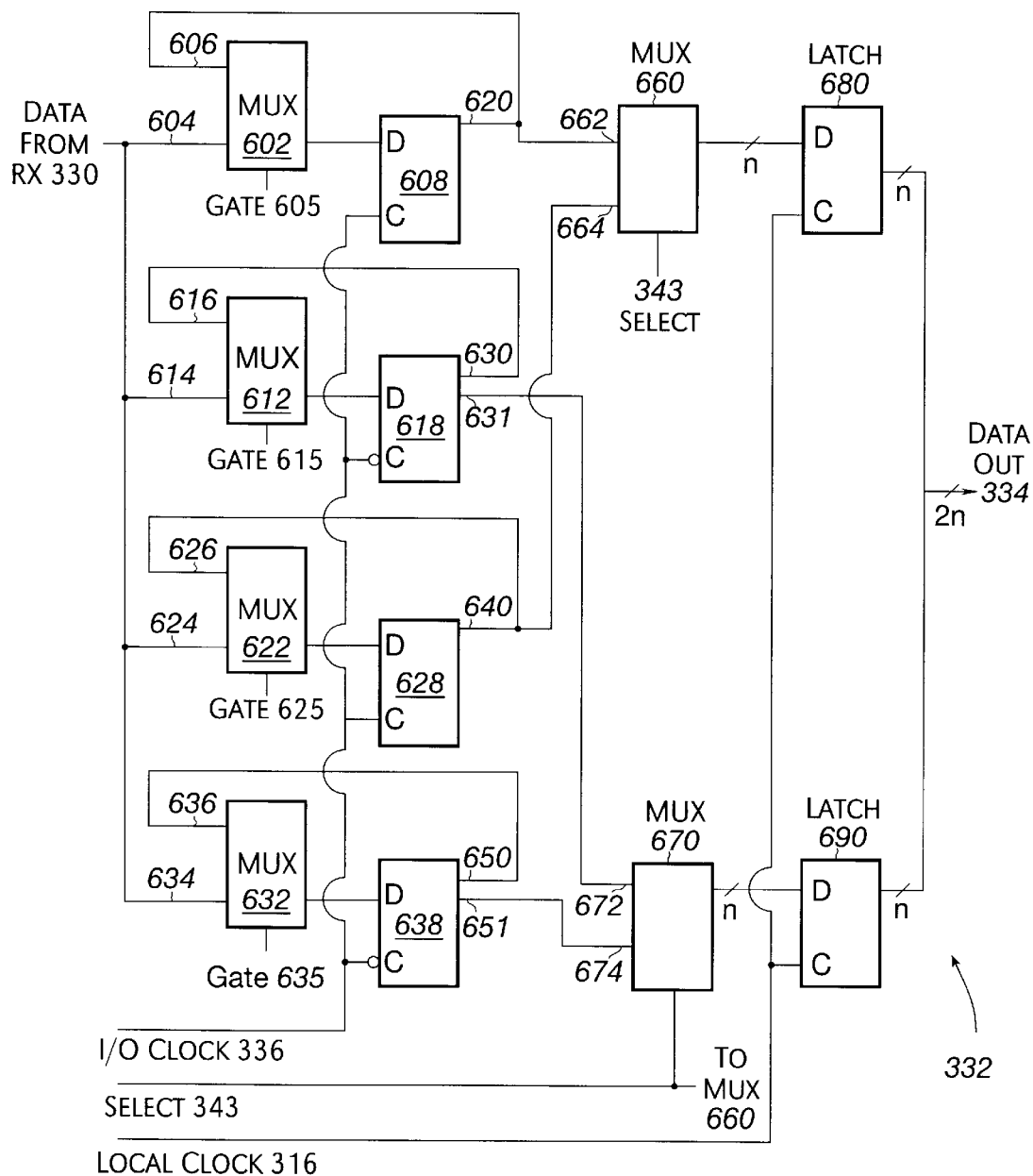
FIG. 6A illustrates another alternative embodiment of an elastic interface according to the present invention.

Additionally, elastic interfaces in accordance with the principles of the present invention are expandable, whereby elasticities may be increased by adding steering and storage elements. An embodiment of a fill speed elastic interface having an elasticity of four bus clock periods is illustrated in FIG. 6A. Interface unit 332 includes a plurality, of MUXs, MUXs 602, 612, 622 and 632. A first input in each MUX receives data stream 322 from RX 330. Thus, data 322 is provided to inputs 604, 614, 624 and 634 of MUXs 602, 612, 622 and 632, respectively. A second input receives a signal output by a corresponding one of latches 608, 618, 628 and 638. Each of latches 608, 61S, 628 and 638 is formed from a pair of cascaded transparent latches. The larch pairs have an internal output of a first one of he pair (L1) coupled to an internal input of a second one of the pair (L2), in master-slave fashion. The L1 and L2 latches are clocked on opposite edges of an input clock signal, and flush data through on complementary "flattops" of the clock signal. For latches 608 and 628, the clock signal is provided by I/O clock 336, and for latches 618 and 638, the inverse of I/O clock 336 provides the clock signal.

Each of latches 608, 618, 628 and 638 provide an output from the slave portion to an input of a corresponding MUX. Latch 608 feeds L2 output 620 to input 606 of MUX 602, L2 output 630 of latch 618 is provided to input 616 of MUX 612, the L2 output 640 of latch 628 feeds back to input 626 of MUX 622, and the L2 output 650 of latch 638 is provided to input 636 of MUX 632. In the embodiment of FIG. 6A, the slave portion of latches 608, 618, 628 and 638 latch the data on the D input on a rising edge of I/O clock 336. Latches 608, 618, 628 and 638 have their respective D inputs coupled to the output of a corresponding 602, 612, 622, and 632, respectively.

MUXs 602, 612, 622 and 632 select between the signals on the corresponding first and second inputs in response to a gate signal, gates 605, 615, 625 and 635, respectively. Gates 605, 615, 625 and 635 are derived from bus clock 306, and each has a period twice that of I/O clock 336. The phase of gate 605 is set during the initialization alignment procedure discussed below, and each of gates 615, 625, 635 is delayed in phase by an additional quarter-period, half-period, and three-quarter period, respectively, relative to gate 605. Gates 605, 615, 625 and 635 may be generated using a delay lock loop (DLL). An embodiment of a DLL which may be used in the present invention is disclosed in commonly owned, co-pending application entitled "Dynamic Wave Pipelined Interface Apparatus and Method Therefor," incorporated herein by reference. Gates 605, 615, 625 and 635 will be discussed further in conjunction a timing diagram illustrated in FIG. 6B.

Data is latched into the local clock via MUXs 660 and 670, and data latches 680 and 690 each of which receives an output signal from a cooing one of latches 608, 618, 628, 638. L2 outputs 620 and 640 from respective ones of latches 608, 628 are provided to first and second inputs 662 and 664 of MUX 660, respectively. First and second inputs 672 and 674 of MUX 670 receive L1 output 631 and 651 of corresponding latches 618 and 638. MUXs 660 and 670 select for outputting the signals on their corresponding first and second inputs in response to select 343, discussed below in conjunction with FIG. 6B. Thus, in response to select 343, MUX 660 outputs either the data on U output 620 or L2 output 640, and substantially simultaneously, MUX 670 outputs either the data on L1 output 631 or L1 output 651.

Data 322 is captured into the local clock frame at output 338 by latches 680 and 690, The outputs of MUXs 660 and 670 are respectively coupled to latches 680 and 690 which are clocked by local clock 316. Latches 680 and 690 are edge-triggered flip-flops. Data is latched on a predetermined edge (positive in the embodiment of FIG. 6A) of local clock 316. Output 338 has a width twice that of the data values in data stream 322. (It would be understood by an artisan of ordinary skill that the present invention may be used in an interface that is a plurality, n, of bits wide. For example, alternative embodiments may be one bit in width, a byte in width, a word in width, etc.) As will be seen in conjunction with FIG. 6B, Output data is valid for a time interval corresponding to a period of local clock 316, which may be twice tat of local clock 314, corresponding to the local clock of the sending chip.

Figure 6B:
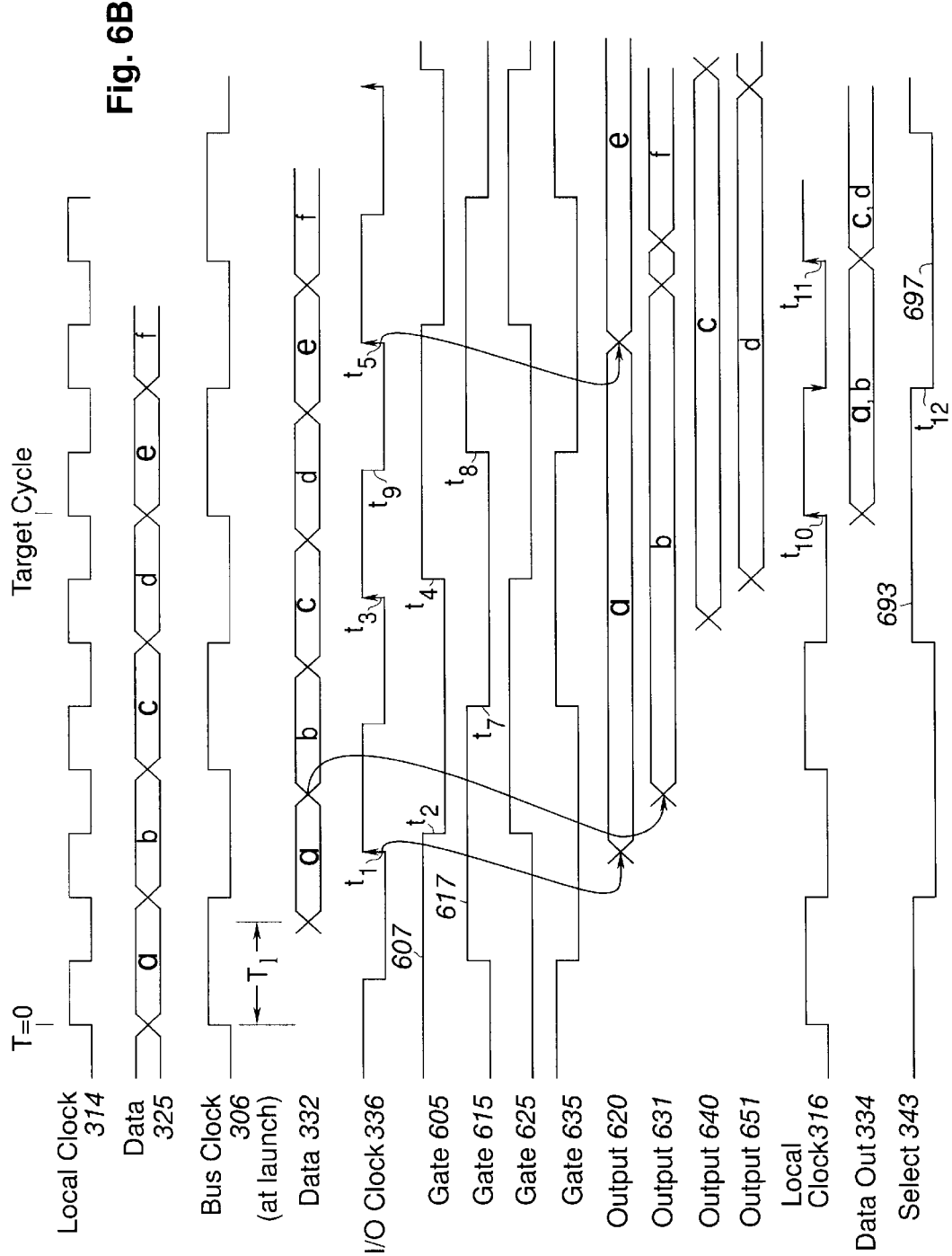
FIG. 6B schematically illustrates a timing diagram of the elastic interface of FIG. 6A.

Refer now to FIG. 6B illustrating a timing diagram for interface unit 332 illustrated in FIG. 6A. Data value "a" arrives in the data stream on data 322 after the interface latency of $T_1$, and in response to The assertion of gate 615 provided to MUX 602, represented by "flattop" 607, data value a is passed by MUX 602 to the D input of latch 608. On edge $t_1$ of I/O clock 336, latch 608 holds data value a on L2 output 620 which is coupled back to input 606 of MUX 602. At edge $t_2$ of gate 615, MUX 602 selects for the signal on input 606, which has the data value a. Gate 615 is negated for one period of bus clock 306, also corresponding to a period of local clock 316, whereby the data value a is maintained on the D input of latch 608. The data value a is held for an additional cycle of bus clock 306 by transition $t_3$ of I/O clock 336, after which the transition $t_4$ of gate 605 switches MUX 602 to select for the data stream on data 322, whereby at edge $t_3$ of I/O clock 336 the fifth data value, "e" in data 332 is latched into latch 608.

A next data value in data 332, data value b is similarly held for four periods of local clock 316. When data value b arrives at unit 332, gate 615 is asserted, represented by "flattop" 617, and selects for data 332 on input 614 of MUX 612. Data value b appears the D input of latch 618. Because I/O clock 336 is negated when value b becomes valid, b falls through to L1 output 631, and at edge $t_6$ of I/O clock 336, one-fourth period of I/O clock 336 after data value b became valid, data value b appears on output 630 of latch 618. Output 630 of latch 618 is fed back to input 616 of MUX 612. Because gate 615 is negated following edge $t_7$, one-eighth I/O clock cycle after edge $t_6$ of I/O clock 336, data value b on output 630 is reasserted at the D input of latch 618 by the action of MUX 612. As a consequence, b is asserted on output 631 for an additional cycle of I/O clock 336. One-eighth of a I/O clock cycle before gate 615 switches, at edge $t_8$, the falling edge, $t_9$, of I/O clock 336 latches b onto L1 output 631 where it remains valid for an additional half-cycle of I/O clock 336 prior to edge $t_5$ of I/O clock 336. Thus data value b is valid at output 631 for one and three-fourths cycles of I/O clock 336. When gate 615 switches at edge $t_8$, MUX 612 outputs data from data stream 322 to the D input of latch 618, whereby, one-fourth I/O clock cycle later, a subsequent data value, "f", becomes valid on output 631. Value f remains valid for one and three-fourths of a period of I/O clock 336, in the same was as described for data value b.

Data values "c" and "d" in data stream 322 are similarly captured into latches 628 and 638. Data value c is asserted on L2 output 640 of latch 628 by the action of MUX 622 and gate 625 in the same way as data values a and e are asserted on output 620 of latch 608. Likewise, data value d is asserted on output 651 of latch 638 by the action of MUX 632 and gate 635 in the same was as data values b and f are asserted on output 631 of latch 618.

Sequential n-bit wide data values are captured onto the local clock frame as 2 n-bit wide data values by the action of MUXs 660 and 670 and corresponding latches 680 and 690. L2 output 620, emitting data values a, e, i, . . . , is coupled to input 662 of MUX 660. The second input to MUX 660, input 664 is coupled to output 640 of latch 628, emitting the sequence of data values c, g, k, . . . Similarly, input 672 of MUX 670 is coupled to output 631 of latch 618 and receives a stream of data values b, f, j, . . . , and input 674 of MUX, is coupled to output 651 that emits the stream of data values d, h, l, . . . MUXs 660 and 670 are controlled by select 343. Select 343 has a period twice that of local clock 316, and has is phase synchronous therewith such that rising edges of local clock 316 are centered on "flattops" of select 343, such as flattops 695 and 697. When select 343 has a first predetermined logic state, "high" in the embodiment of FIGS. 6A–6B, MUXs 660 and 670 select for outputting signals on inputs 662 and 672, respectively. Thus, in response a "high" on select 343, MUXs 660 and 670 respectively output the data streams a, e, i, ..., and b, f, j, ... When select 343 is low, the streams c, g, k, ..., and d, h, l, ... are output bu MUX 660 and MUX 670, respectively. The outputs of MUX 660 and 670 are latched into corresponding latches, latch 680 and latch 690 on a predetermined edge (positive in the embodiment of FIGS. 6A–6B, although an artisan of ordinary skill would understand that an alternative embodiment, which would be within the spirit and scope of the present invention, may use complementary logic) of local clock 316. Thus, on rising edge $t_{10}$ of local clock 316, latch 680 outputs the n-bit portion having the data value a on output 338, and latch 690 outputs the n-bit portion having the data value b on output 338, which is 2 n-bits wide. On a next rising edge of local clock 316, edge $t_{11}$, latch 680 outputs the n-bit portion having the data value c on output 338, and latch 690 outputs the n-bit portion having the data value d on output 338, since select 343 has switched to the "low" logic state at edge $t_{12}$. Data out 338 will sequentially stream alternating pairs of data values from data stream 325 in this way in response to succeeding edges of local clock 316.

Before data can be transmitted across elastic interface 322, gate 605 must be initialized. Because the latency across the interface can vary by more than one local clock period, gate 605 must be initialized with the proper phase. As previously described, the period of gate 605 is twice that of I/O clock 336, and local clock 316. Gate 605 is phase synchronous with I/O clock 316 such that centers of flattop portions of gate 605 are delayed by one-eighth cycle of I/O clock 316 relative to preselected edges thereof, the negative edges in the embodiment of FIGS. 6A–6B.

Gate 605 may be initialized, in an embodiment of the present invention, by transmitting a synchronization (sync) pattern on power up or reset. Referring again to FIG. 3, in response to a reset or power up of the data processing system, initialization alignment procedure (IAP) mode signal 340 is asserted, whereby MUX 328 selects for outputting a predetermined sync pattern. IAP mode signal 340 may be asserted, in an embodiment of the present invention, by CPU 210 in response to BIOS instructions included in ROM 216.

In the embodiment of elastic interface unit 332 illustrated in FIG. 6A, data can arrive in a four-cycle window without creating synchronization problems. Elastic interface unit 332 in FIG. 6A is referred to as having an elasticity of four. In the IAP, the synchronization pattern is required to be periodic with a period, P, equal to or greater than the elasticity of the elastic device. Thus, for the elastic interface unit 332 of FIG. 6A, a suitable synchronization pattern would be a plurality of bits having the repeating pattern "1000". Other bit patterns may also be used. For example, bit patterns complementary to the exemplary patterns hereinabove may alternatively be used.

In setting the phase of gates 605, 615, 625 and 635, all are manipulated simultaneously. Output 620 of latch 608 and output 650 of latch 638 may be sampled while the sync pattern is being sent. Gate 605 is initialized with a preselected phase. If, for the sync pattern described hereinabove for elastic interface unit 332 having elasticity four, a "1" is detected at output 620, and a "0" on output 650, gates 605, 615, 625 and 635 then 605 is properly phased. Otherwise, the phase of gate 605, and concomitantly the corresponding phases of gates 615, 625 and 635, should be shifted by one-eighth of the period of I/O clock 336, and the synchronization pattern retransmitted. This process may be repeated until the sync pattern is captured. As previously discussed, gates 605, 615, 625 and 635 may be generated using a DLL, an embodiment of a DLL is disclosed in the co-pending commonly assigned, above-referenced, application entitled, "Dynamic Wave Pipelined Interface Apparatus and Method Therefor," incorporated herein by reference.

In this way, a mechanism for maintaining data synchrony through interfaces in a data processing system has been provided. Received data is captured into a plurality of storage elements, and selectively steered into the receiving chip on a pre-selected target cycle that is synchronized with the chip clock. Initial synchronization is established dynamically by performing an IAP. The mechanism of the present invention provides data synchronization in a data processing system having latencies that vary by more than one bus clock cycle.

Although the present invention and its advantages have been described in detail, it should be understood that various changes, substitutions and alterations can be made herein without departing from the spirit and scope of the invention as defined by the appended claims.

What is claimed is:

1. An interface apparatus comprising:
   a first storage device operable for storing a first set of data values;
   a second storage device operable for storing a second set of data values, wherein said first and second storage devices are operable for latching data on opposite edges of a first clock signal, and wherein member data values of said first and second sets of data values have a first predetermined width, n; and
   circuitry coupled to said first and second storage devices operable for outputting a first data value from said first storage device and a second data value from said second storage device in response to a second clock signal, said first and second data values comprising an output value having a second width, 2 n.

2. The apparatus of claim 1 wherein said first and second sets of data values are derived from an input data stream, and wherein said first and second data values comprise sequential data values in said input data stream.

3. The apparatus of claim 1 wherein said second clock has a period equal to the period of said first clock.

4. The apparatus of claim 2 wherein said first and second data values are valid in a time interval twice a data valid time interval of data in said input stream.

5. The apparatus of claim 1 wherein said first storage device comprises an edge triggered flip-flop (FF), and said second storage device comprises a transparent latch.

6. The apparatus of claim 2 wherein said first clock is derived from a clock signal received from a sending device transmitting said input data stream.

7. The apparatus of claim 1 further comprising third and fourth storage elements each having an input respectively coupled to corresponding outputs of said first and second storage devices, said third and fourth storage elements latching data in response to a predetermined edge of said second clock signal.

8. The apparatus of claim 7 wherein said third and fourth storage elements comprise edge triggered flip-flops.

9. The apparatus of claim 7 wherein output signals of said third and fourth storage elements comprise first and second portions of said output data value.

10. An interface apparatus comprising:
a first plurality of storage devices, each storage device of said plurality operable for storing a corresponding one of plurality of sets of data values, wherein each member data value of said plurality of sets has a first predetermined first bit width, n, said first plurality storing data values in response to a first clock signal;
selection circuitry coupled to said plurality of storage devices operable for sequentially outputting each corresponding set of data values, said data values received in an input data stream, said circuitry sequentially outputting each corresponding set of data values in response to at least one first control signal; and
circuitry coupled to said plurality of storage devices operable for receiving said plurality of sets of data values and sequentially outputting in response thereto a set of output data values, each output data value having a predetermined second bit width, m·n, wherein said output data values are output in response to a second clock.

11. The apparatus of claim 10 wherein said period of said at least one first control signal is twice the period of said first clock.

12. The apparatus of claim 10 wherein said first plurality of storage devices latch data in response to said first clock.

13. The apparatus of claim 10 wherein said selection circuitry operable for sequentially outputting each corresponding set of data values comprises a first plurality of multiplexers (MUXs), each MUX of said plurality having a first input operable for receiving said input data stream, each MUX having an output coupled to an input of a corresponding one of said first plurality of storage devices, wherein each MUX has a second input operable for receiving an first output signal from said corresponding one of said plurality of storage devices, and wherein said at least one first control signals comprises a first plurality of control signals, each MUX selecting for outputting signals on said first and second inputs in response to a respective one of said plurality of first control signals.

14. The apparatus of claim 13 wherein a first one said first plurality of control signals has a preselected phase relative to a predetermined edge of said first clock signal.

15. The apparatus of claim 14 wherein a next one of said first plurality of control signals is shifted in phase by one-fourth period relative to said first one of said first plurality of control signals, and wherein each succeeding one of said first plurality of control signals is shifted in phase by one-fourth period relative to a preceding one of said first plurality of control signals.

16. The apparatus of claim 10 wherein said first plurality of storage devices includes first and second edge-triggered flip-flops (FFs), said first and second FFs latching data on a first predetermined edge of said first clock, and first and second cascaded transparent latch pairs, each of said first and second cascaded latch pairs having first and second outputs corresponding to each transparent latch of a corresponding latch pair, each of said second outputs being coupled to a corresponding portion of said selection circuitry operable for sequentially outputting each said corresponding set of data values, and wherein said second output latches data on a second predetermined edge of said first clock.

17. The apparatus of claim 16 wherein said first and second predetermined edges of said first clock are complementary.

18. The apparatus of claim 10 wherein each of said storage devices outputs each data value in each corresponding set of data values for a predetermined interval of time relative to said first clock signal.

19. The apparatus of claim 10 wherein said circuitry for receiving said plurality of sets of data values includes a second plurality of storage devices including m devices, each device of said second plurality of storage devices for receiving preselected ones of said plurality of sets of data values, each storage device providing an n-bit portion of said set of m·n bit output data values, each storage device of said second plurality of storage devices operable for storing data values in response to said second clock.

20. The apparatus of claim 19 wherein said second plurality of storage devices includes third and fourth storage devices, said third storage device operable for alternately receiving first and second ones of said plurality of sets of data values, and said fourth storage device operable for alternately receiving third and fourth ones of said plurality of sets of data values, an output of said third storage device providing a first n-bit portion of said set of output data values, and an output of said fourth storage device providing a second n-bit portion of said set of output data values, said third and fourth storage devices operable for storing 2 n bit data values in response to said second clock.

21. The apparatus of claim 20 wherein said third and fourth storage devices each comprise an edge-triggered flip-flop operable for storing data values on a corresponding output on response to a predetermined edge of said second clock.

22. The apparatus of claim 20 wherein said circuitry for receiving said plurality of sets of data values further includes first and second multiplexers (MUXs) coupled, respectively to an corresponding input of said third and fourth storage devices, said first MUX operable for receiving said first and second ones of said plurality of sets of data values at a first and second input thereof, respectively, and said second MUX operable for receiving said third and fourth ones of said plurality of sets of data values at a first and second input thereof, respectively, and wherein said first and second MUXs select for outputting signals on corresponding first and second inputs in response to a second control signal.

23. The apparatus of claim 22 wherein said second control signal has a preselected phase and frequency relationship to said second clock signal.

24. The apparatus of claim 23 wherein a frequency of said second clock is twice a frequency of said second control signal.

25. The apparatus of claim 23 wherein flattop portions of said second control signal are substantially centered on a predetermined set of edges of said second clock signal.

26. The apparatus of claim 25 wherein said predetermined set of edges of said second clock signal comprises a set of rising edges.

27. A data processing system comprising:
a first data processing device; and
a second data processing device coupled to said first data processing device via an elastic interface, said elastic interface comprising:
a first storage device operable for storing a first set of data values;
a second storage device operable for storing a second set of data values, wherein said first and second storage devices are operable for latching data on opposite edges of a first clock signal, and wherein member data values of said first and second sets of data values have a first predetermined width, n; and
circuitry coupled to said first and second storage devices operable for outputting a first data value from said first storage device and a second data value from said second storage device in response to a second clock signal, said first and second data values comprising an output value having a second width, 2n.

28. The data processing system of claim 27 wherein said first and second of data values are derived from an input data stream, said first and second data values comprising sequential data values in said input data stream, said first and second data values are valid in a time interval twice a data valid time interval of data in said input stream, and said first clock is derived from a clock signal received from a sending device transmitting said input data stream.

29. The data processing system of claim 27 wherein said elastic interface further comprises third and fourth storage elements each having an input respectively coupled to corresponding outputs of said first and second storage devices, said third and fourth storage elements latching data in response to a predetermined edge of said second clock signal, and wherein output signals of said third and fourth storage elements comprise first and second portions of said output data value.

30. The apparatus of claim 29 wherein said third and fourth storage elements comprise edge triggered flip-flops.

31. A data processing system comprising:
  a first data processing device; and
  a second data processing device coupled to said first data processing device via an elastic interface, said elastic interface comprising:
    a first plurality of storage devices, each storage device of said plurality operable for storing a corresponding one of plurality of sets of data values, wherein each member data value of said plurality of sets has a first predetermined first bit width, n, said first plurality storing data values in response to a first clock signal;
    selection circuitry coupled to said plurality of storage devices operable for sequentially outputting each corresponding set of data values, said data values received in an input data stream, said circuitry sequentially outputting each corresponding set of data values in response to at least one first control signal; and
    circuitry coupled to said plurality of storage devices operable for receiving said plurality of sets of data values and sequentially outputting in response thereto a set of output data values, each output data value having a predetermined second bit width, m·n, wherein said output data values are output in response to a second clock.

32. The data processing system of claim 31 wherein said wherein said selection circuitry operable for sequentially outputting each corresponding set of data values comprises a first plurality of multiplexers (MUXs), each MUX of said plurality having a first input operable for receiving said input data stream, each MUX having an output coupled to an input of a corresponding one of said first plurality of storage devices, wherein each MUX has a second input operable for receiving an first output signal from said corresponding one of said plurality of storage devices, and wherein said at least one first control signals comprises a first plurality of control signals, each MUX selecting for outputting signals on said first and second inputs in response to a respective one of said plurality of first control signals.

33. The data processing system of claim 31 wherein said circuitry for receiving said plurality of sets of data values includes a second plurality of storage devices including devices, each device of said second plurality of storage devices for receiving preselected ones of said plurality of sets of data values, each storage device providing an n-bit portion of said set of m·n bit output data values, each storage device of said second plurality of storage devices operable for storing data values in response to said second clock.

34. The data processing system of claim 33 wherein said second plurality of storage devices includes third and fourth storage devices, said third storage device operable for alternately receiving first and second ones of said plurality of sets of data values, and said fourth storage device operable for alternately receiving third and fourth ones of said plurality of sets of data values, an output of said third storage device providing a first n-bit portion of said set of output data values, and an output of said fourth storage device providing a second n-bit portion of said set of output data values, said third and fourth storage devices operable for storing 2n bit data values in response to said second clock.

35. The data processing system of claim 31 wherein each of said storage devices outputs each data value in each corresponding set of data values for a predetermined interval of time relative to said first clock signal.

36. The data processing system of claim 34 wherein said circuitry for receiving said plurality of sets of data values further includes first and second multiplexers (MUXs) coupled, respectively to an corresponding input of said third and fourth storage devices, said first MUX operable for receiving said first and second ones of said plurality of sets of data values at a first and second input thereof, respectively, and said second MUX operable for receiving said third and fourth ones of said plurality of sets of data values at a first and second input thereof, respectively, and wherein said first and second MUXs select for outputting signals on corresponding first and second inputs in response to a second control signal.

37. The data processing system of claim 34 wherein said third and fourth storage devices each comprise an edge-triggered flip-flop operable for storing data values on a corresponding output on response to a predetermined edge of said second clock.

38. A method of interfacing data processing devices comprising the steps of:
  storing a first plurality of sets of data values in a first plurality of storage elements, wherein each data value of each of said first plurality of sets is stored for a predetermined time interval relative to a first clock, each data value communicated in a data stream between said data processing devices;
  selectively sequentially receiving members of said first plurality of data values at a second plurality of storage elements having m storage elements; and
  storing said members received in said receiving step in corresponding elements of said second plurality of storage elements in response to a second clock, an output of each storage element of said second plurality of storage elements providing an n-bit wide portion of an (m·n)-bit wide output data value.

39. The method of claim 38 wherein said step of sequentially receiving members of said first plurality of data values comprises the step of, for each storage element of said second plurality of storage elements, sequentially receiving members of predetermined sets of said first plurality of sets of data values.

40. The method of claim 39 wherein said step of sequentially receiving members of predetermined sets of said first plurality of sets of data values comprises the steps of:
  providing said each of said predetermined sets of said first plurality of sets of data values to corresponding inputs of a plurality of multiplexers (MUXs), wherein each MUX outputs signals to a corresponding storage element of said second plurality of storage elements;

selecting for outputting data on said corresponding inputs in response to a first control signal.

41. The method of claim 40 wherein said first plurality of storage elements comprises first and second latches and said plurality of multiplexers comprises first and second MUXs, said first MUX having a first input for receiving first predetermined set of data values and a second input for receiving a second predetermined set of data values, and said second MUX having a first input for receiving a third predetermined set of data values and a second input for receiving a fourth predetermined set of data values.

42. The method of claim 40 wherein said first control signal has a preselected phase and frequency relationship to said second clock signal.

43. The method of claim 38 wherein said step of storing a first plurality of sets of data values comprises the substeps of:

receiving said data stream at an input to selection circuitry operable for selectively outputting portions of said data stream to corresponding storage elements of said first plurality of storage elements, said selection circuitry selectively outputting said portions in response to a first plurality of control signals; and latching data output by said selection circuitry on at least one output of each of said corresponding storage elements in response to said first clock, and wherein said selection circuitry is operable for receiving a predetermined one of said at least one output of each of said corresponding storage elements, said selection circuitry alternatively selectively outputting signals received therefrom in response to said plurality of first control signals.

44. The method of claim 43 wherein said selection circuitry operable for selectively outputting portions of said data stream comprises a plurality of multiplexers (MUXs), each MUX of said plurality of MUXs having first and second inputs, said first input operable for receiving said data stream, and said second input of each MUX operable for receiving said predetermined one of said at least one output of said corresponding storage element.

45. The method of claim 43 wherein a first one said first plurality of control signals has a preselected phase relative to a predetermined edge of said first clock signal, and wherein a next one of said first plurality of control signals is shifted in phase by one-fourth period relative to said first one of said first plurality of control signals, and wherein each succeeding one of said first plurality of control signals is shifted in phase by one-fourth period relative to a preceding one of said first plurality of control signals.

* * * * *

UNITED STATES PATENT AND TRADEMARK OFFICE
CERTIFICATE OF CORRECTION

PATENT NO. : 6,542,999 B1
DATED : April 1, 2003
INVENTOR(S) : Daniel Mark Dreps, Kevin Charles Gower and Frank David Ferraiolo It is certified that error appears in the above-identified patent and that said Letters Patent is hereby corrected as shown below:

Column 9,
Line 42, please replace "cooling" with -- corresponding --.
Line 54, following "Data" please inesrt -- stream --.

Column 15,
Line 5, following "second" please insert -- sets --.

Column 17,
Line 6, following "receiving" please insert -- a --.

Signed and Sealed this

Thirtieth Day of December, 2003

JAMES E. ROGAN
*Director of the United States Patent and Trademark Office*